United States Patent Office 3,186,985
Patented June 1, 1965

3,186,985
NOVEL 6-KETO-4-DEHYDRO-STEROIDS AND PROCESSES FOR THEIR MANUFACTURE
Cecil H. Robinson, Montclair, N.J., assignor to Schering Corporation, Bloomfield, N.J., a corporation of New Jersey
No Drawing. Filed May 7, 1963, Ser. No. 278,743
16 Claims. (Cl. 260—239.55)

This invention relates to a novel process and to novel products and intermediates produced thereby. More particularly, this invention relates to a novel process whereby a compound of the cyclopentanophenanthrene series having a 3,5α-cyclo-6-ketone system is photolyzed to produce a compound of the cyclopentanophenanthrene series having a Δ⁴-6-ketone system, which compounds are useful therapeutically and as intermediates in producing other useful compounds. Also included in my invention are novel intermediate some of which are also therapeutically valuable.

My novel process whereby a steroidal 3,5α-cyclo-6-ketone (I) in solution is photolyzed with ultraviolet light to produce a steroidal Δ⁴-6-ketone (II) may be depicted graphically as shown below (the A and B rings, only, of the steroidal molecule are shown):

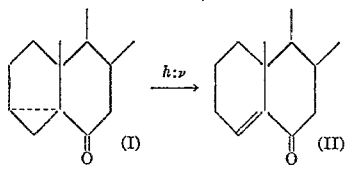

The following specific reaction is illustrative of my process. A solution of 3,5α-cycloandrostan-17β-ol-6-one 17-acetate in dioxan under a nitrogen atmosphere in a quartz vessel is irradiated for two hours at 25–28° C. with ultraviolet light supplied by a Hanovia 250 watt mercury lamp. Evaporation in vacuo of the irradiated solution followed by purification, such as by crystallization from methanol, yields the Δ⁴-6-keto steroid, 4-androsten-17β-ol-6-one 17-acetate.

By my process, any compound of the cyclopentanophenanthrene series which has a 3,5α-cyclo-6-ketone system may be photolyzed by means of ultraviolet light to give a cyclopentanophenanthrene having a Δ⁴-6-ketone system. Among the compounds suitable as intermediates in my process are 3,5α-cyclo-6-ketones of the androstane and pregnane series such as those defined by the following structural formula Ia:

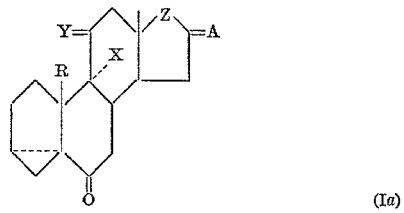

wherein A is a member selected from the group consisting of hydrogen, (H, (α or β)-lower alkyl), (H, αOH), and methylene; R is a member selected from the group consisting of hydrogen and methyl; X is a member selected from the group consisting of hydrogen and halogen; Y is a member selected from the group consisting of hydrogen, keto, and (H, βOH); and when Y is hydrogen, X is hydrogen; and Z is a member selected from the group consisting of

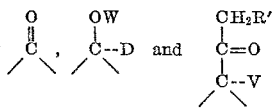

W being a member selected from the group consisting of hydrogen and lower alkanoyl; D being a member selected from the group consisting of hydrogen, lower alkyl, ethinyl, methylethinyl, and halogenoethinyl; V being a member selected from the group consisting of hydrogen, hydroxy, and lower alkanoyloxy; and R' being a member selected from the group consisting of hydrogen, hydroxy, and acyloxy; and when V is hydroxy and A is (H, αOH), the 16α,17α-alkylidenedioxy derivatives thereof.

By lower alkyl is included hydrocarbons having up to 4 carbon atoms such as methyl, ethyl, propyl, isopropyl, n-butyl, iso-butyl, and tertiary butyl.

Illustrative of the acyl groups which may be present at C-21 are inorganic esters such as sulfate and phosphate as well as acid residues of hydrocarbon carboxylic acids having up to 12 carbon atoms including lower alkanoates such as formate, acetate, propionate, n-butylate, iso-butylate, valerate, iso-valerate, caproate (n-hexanoate); aromatic acyl residues such as benzoate and toluate, as well as the acyl portions of dibasic acids such as succinate and phthalate.

Some 3,5α-cyclo-6-keto steriod intermediates of my process are known, for example 3,5α-cycloandrostan-17β-ol-6-one 17-acetate and 17α-ethinyl-3,5α-cycloandrostan-17β-ol-6-one. Other 6-keto-3,5α-cyclo-starting compounds, e.g., 3,5α-cyclopregnane-6,20-dione, may be prepared from the corresponding 6-hydroxy-3,5α-cyclo-steroid, e.g. 3,5α-cyclopregnan-6β-ol-20-one by oxidation with chromic acid in acetone according to known procedures.

In general, the 6-keto-3,5α-cyclo-starting compounds exemplified by Formula Ia may be prepared from a 3-hydroxy-Δ⁵-steroid by first forming the corresponding Δ⁵-3-tosylate ester followed by treatment thereof with potassium acetate in acetone/water according to known procedures whereby is produced the corresponding 3,5α-cyclo-6β-hydroxy intermediary steroids. Conversion to the 3,5α-cyclo-6-ketone starting compound of our process is then effected by a chromic acid oxidation via known techniques. Thus, for example, 17α-ethinyl-19-nor-5-androstene-3,17β-diol upon treatment with p-toluenesulfonyl chloride in pyridine is converted to the corresponding 3-tosylate, i.e., 17α-ethinyl-19-nor-5-androstene-3,17β-diol 3-tosylate, which, in turn, is treated with potassium acetate in acetone/water according to known techniques to yield 17α-ethinyl-3,5α-cyclo-19-nor-androstane - 6β,17β - diol convertible by oxidation with chromic acid to the starting compound, 3,5α-cyclo-19-nor-androstan-17β-ol-6-one.

In addition to the 6-keto-3,5α-cyclo-steroid intermediates necessary to my process, as exemplified by compounds defined by Formula Ia, the corresponding 6β-hydroxy derivatives as shown below are also valuable intermediates.

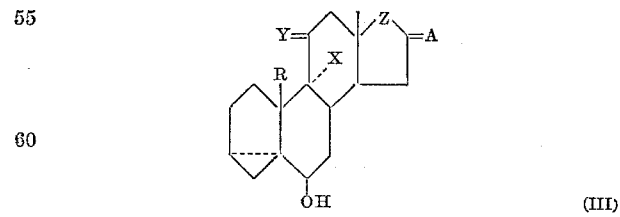

wherein R, X, Y, and Z are as defined for Formula Ia, and A is a member selected from the group consisting of hydrogen, (H, (α or β)-lower alkyl), and methylene.

In addition to being valuable intermediates, some of the compounds of Formula III also possess thereapeutic activity per se. For example, 17α-ethinyl-19-nor-3,5α-cycloandrostane-6β,17β-diol 17-acetate and 17α-chloroethinyl-19-nor-3,5α-cycloandrostane-6β,17β - diol 17 - acetate are valuable as anti-fertility agents.

In my process, prior to irradiation with ultraviolet light, any reactive ketone groups present elsewhere than at C–6 in the 6-keto-3,5α-cyclo-starting steroid must be protected, such as by a ketal group, or, in the case of a corticoid, the sensitive side chain at C–17 may be protected by the 17α,20;20,21-bis-methylenedioxy derivative. Such protective groups are preferably introduced prior to formation of the 3,5α-cyclo-6-oxygenated system in the preparation of the starting compounds.

In the case of a corticoid starting steroid such as 3,5α-cyclopregnane-17α,21-diol-6,11,20-trione, which is being prepared from the known steroid, 5-pregnene-3β,17α,21-triol-11,20-dione according to procedures outlined hereinabove, it is usually preferable to introduce the protective grouping, e.g., 17α,20;20,21-bis-methylenedioxy prior to preparation of the 3-tosylate ester. By way of example, 5-pregnene-3β,17α,21-triol-11,20-dione is converted to the corresponding 17α,20;20,21-bis-methylenedioxy derivative utlizing known techniques such as with formaldehyde and hydrochloric acid in chloroform. Esterification of the 3-hydroxy group with one mole of p-toluenesulfonyl chloride in pyridine followed by treatment of the 3β-tosyloxy-5-pregnene with potassium acetate in aqueous acetone yields 17α,20;20,21-bis-methylenedioxy - 3,5α - cyclopregnen-6β-ol-11-one, convertible by oxidation with chromic acid to the desired starting compound, i.e., 17α,20;20,21-bis-methylenedioxy-3,5α-cyclopregnane-6,11-dione. Irradiation of the latter compound in ethanol solution with ultraviolet light yields the novel product, 17α,20;20,21-bis-methylenedioxy-4-pregnene-6,11-dione which is then converted by aqueous formic acid to the novel corticoid analog, 4-pregnene-17α,21-diol-6,11,20-trione.

Similarly, when preparing a 20-keto-21-desoxypregnane starting compound, such as 20-ethylenedioxy-3,5α-cyclopregnane-6,20-dione, the 20-ketal function is preferably introduced prior to the 3,5α-cyclo-6-keto system. Thus, 5-pregnen-3β-ol-20-one is ketalized at C–20 using ethylene glycol according to known procedures. The resulting 20-ethylenedioxy-5-pregnen-3β-ol is then converted to the corresponding 3-tosylate ester which, in turn, is treated with potassium acetate in acetone/water to yield 20-ethylenedioxy-3,5α-cyclopregnan-6β-ol convertible by oxidation with chromic acid to the desired starting compound, 20-ethylenedioxy-3,5α-cyclopregnan-6-one.

When a 16α-hydroxy-3,5α-cyclo-6-keto-Δ⁴-steroid is desired, the 16α-hydroxy group is preferably introduced into the molecule after oxidation of the 6β-hydroxy function in a 3,5α-cyclo-intermediate of Formula III to the corresponding 6-keto-3,5α-cyclo-intermediate of Formula Ia. This is effected conveniently via known microbiological techniques such as that utilizing the microorganism *Streptomyces roseochromogenus* (Waksman Collection No. 3689).

Thus, when it is desired to prepare 4-pregnene-16α,17α,21-triol-6,20-dione, the 16α-hydroxy function may be introduced by the action of *Streptomyces roseochromogenus* into the 6-keto intermediate, 17α,20;20,21-bis-methylenedioxy-3,5α-cyclopregnane-6,11-done prior to irradiation with ultraviolet light. The resulting 17α,20;20,21-bis-methylenedioxy - 4 - pregnene-16α-ol-6,11-dione is then converted by aqueous formic acid to the novel corticoid analog, 4 - pregnene-16α,17α,21-triol-6,11,20-trione. Alternatively, the 16α-hydroxy function may be introduced into the corresponding 16-desoxy-Δ⁴-6-keto steroid, 4-pregnene-17α,21-diol-6,11,20-trione.

In general, in addition to having ketone groups other than at C–6 protected by a derivative such as a ketal, and the corticoid C–17 side chain protected by a derivative such as the 17α,20;20,21-bis-methylenedioxy group, the 6-keto-3,5α-cyclo-starting steroids of my process are preferably devoid of other reactive chromophores in the molecule having an ultraviolet absorption in the 220–400 mμ region, such as conjugated dienes, α-diketones, α-oximino ketones, nitrite esters, etc.

Radiant energy containing ultraviolet light in the range of 2000–4400 A. for use in my process is conveniently supplied by a Hanovia high pressure mercury arc lamp with a mercury sleeve, while the 3,5α-cyclo-6-keto steroid to be irradiated is contained in an ultraviolet transmitting vessel such as a quartz vessel or a water-cooled Vycor-immersion well.

During the course of the photolysis of a 3,5α-cyclo-6-keto steroid, a stream of nitrogen or other inert gas is generally bubbled through the solution (although this is not always necessary).

Solvents suitable for use in my process are nonreactive solvents, which are transparent to ultraviolet radiation and in which the 3,5α-cyclo-6-keto starting steroid is soluble. Exemplary of solvents which may be used are ethers (e.g., dioxan, tetrahydrofuran), alcohols (e.g., methanol, ethanol), and aliphatic hydrocarbons (e.g., heptane, hexane, etc.). The preferred solvents are dioxan and ethanol.

The temperature at which the photolytic process of this application is carried out is within the range of —40° C. to +40° C. depending on the freezing or boiling points of the solvent used.

Typical 6-keto-Δ⁴-steroids which may be prepared by my process via the ultraviolet irradiation of the corresponding 6-keto-3,5α-cyclo-steroids are exemplified by compounds of the following Formula IIa:

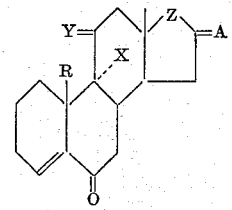

(IIa)

wherein A, R, X, and Z are as defined for Formula Ia and Y is a member selected from the group consisting of hydrogen and keto, and when Y is hydrogen, X is hydrogen.

The 6-keto-Δ⁴-steroids of Formula IIa are therapeutically valuable and, in general, posses therapeutic properties similar to those possessed by the corresponding 3-keto-Δ⁴-steroids and may be administered in similar pharmaceutical forms and for the same indications for which the corresponding 3-keto-Δ⁴-steroids would be applicable. For example, 17α-ethinyl-4-androsten-17β-ol-6-one possesses progestational activity similar to that of ethisterone (17α-ethinyl-4-androsten-17β-ol-3-one) and may be administered orally in the form of tablets or capsules. The pharmaceutical preparations are prepared according to procedures well known in the art.

The novel 6-keto-Δ⁴-steroids of Formula IIa having a cortical side chain at C–17, i.e., those compounds wherein Z is

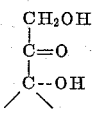

and esters thereof, possess corticoid activity and are valuable as anti-inflammatories. A preferred compound of this group is 4-pregnene-11β,17α,21-triol-6,20-dione.

The 21-desoxy-6-keto-Δ⁴-steroids of Formula IIa, i.e., those compounds wherein Z is

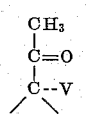

V being hydrogen, hydroxy, and lower alkanoyloxy, are progestational agents and, thus, are useful in the treatment of ailments such as habitual and threatened abortion, premature labor, premenstrual tension, female hypogonadism and the like.

The 6-keto-Δ⁴-steroids prepared by my process wherein Z is

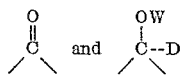

W and D being defined as for Formula Ia, possess anabolic and androgenic activity and may be used in a manner similar to known anabolic/androgenic agents in the treatment of ailments such as geriatric disorders, metabolic imbalance in children, and post-surgical therapy. Additionally, 17α-alkinyl derivatives of Formula IIa, such as 17α-ethinyl-19-nor-4-androsten-17β-ol-6-one, possess progestational and anti-fertility properties.

The preferred class of compounds of my invention are the 17α-substituted-6-keto-17β-hydroxy-Δ⁴-androstenes of formula IIa including the novel intermediates useful in their preparation.

In addition to being therapeutically active per se, the 6-keto-Δ⁴-steroids of this invention are valuable as intermediates in preparing a novel class of therapeutically valuable steroids, i.e., 3-desoxy-4,6-dienes such as shown below in Formula IV wherein A, R, X, Y, and Z are as defined for Formula Ia.

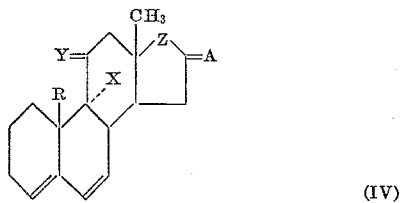

(IV)

Thus, reduction of a 6-keto-Δ⁴-steroid of Formula IIa, e.g., 17α-ethinyl-19-nor-4-androsten-17β-ol-6-one 17-acetate, with sodium borohydride or lithium aluminum hydride followed by acid treatment of the resulting Δ⁴-6-hydroxy steroid, e.g., 17α-ethinyl-19-nor-4-androstene-6β,17β-diol 17-acetate, or, alternatively, by dehydration of the 6-tosylate or 6-mesylate thereof with an agent such as collidine will yield a 3-desoxy-4,6-diene; e.g., 17α-ethinyl-19-nor-4,6-androstadiene-17β-ol 17-acetate, valuable as an anti-fertility agent. In general, the novel 3-desoxy-4,6-dienes of Formula IV possess a utility similar to that of their 3-desoxy-6-keto-4-monoene precursors of Formula IIa.

The following are examples which illustrate our invention. It is to be understood that the invention is not to be limited to the exact details of operation or exact compounds shown or described as obvious modifications and equivalents will be apparent to one skilled in the art. The invention is, therefore, to be limited only by the scope of the appended claims.

EXAMPLE 1

4-androsten-17β-ol-6-one 17-acetate

Irradiate a solution of 3,5α-cycloandrostan-6-one-17β-ol 17-acetate (4.0 g.) in dioxan (150 ml.) at 25–28° C. under an atmosphere of nitrogen in a quartz vessel using a Hanovia 250-watt mercury lamp. After 2 hours of irradiation, evaporate the solution in vacuo to a residue. Purify the residue by crystallization twice from methanol, then twice from isopropyl ether, to give 4-androsten-17β-ol-6-one 17β-acetate, M.P. 159–164° C., [α]$_D$ +26°.

Chromatography of the mother liquors on Florisil gives, on elution with hexane: benzene mixtures, more of 4-androsten-17β-ol-6-one 17β-acetate.

EXAMPLE 2

17α-ethinyl-4-androsten-17β-ol-6-one

Irradiate a solution of 17α-ethinyl-3,5α-cycloandrostan-17β-ol-6-one (3 g.) in ethanol (150 ml.) in the manner of Example 1 to give 17α-ethinyl-4-androsten-17β-ol-6-one.

EXAMPLE 3

17α-ethinyl-3,5α-cycloestran-17β-ol-6-one

A. 17α-ETHINYL-5-ESTRENE-3β,17β-DIOL 3-p-TOLUENESULPHONATE

To a solution of 17α-ethinyl-5-estrene-3β,17β-diol (10 g.) in pyridine (50 ml.) at 0–5° C., add p-toluenesulphonyl chloride (15 g.) and allow the mixture to stand at 0–5° C. for 20 hours. Then dilute the reaction mixture with water and filter the resultant precipitate. Wash the residue on the filter with water and dry to give 17α-ethinyl-5-estrene-3β,17β-diol 3-p-toluenesulphonate.

B. 17α-ETHINYL-3,5α-CYCLOESTRANE-6β,17β-DIOL

Reflux for 90 minutes a solution of 17α-ethinyl-5-estrene-3β,17β-diol 3-p-toluenesulphonate (10 g.) in acetone (175 ml.) and water (175 ml.) containing potassium acetate (14 g.). Cool the solution, then dilute with water and extract with ether. Combine the ethereal extracts and wash with water, dry (Na$_2$SO$_4$) and evaporate to a residue substantially of 17α-ethinyl-3,5α-cycloestrane-6β,17β-diol. Purify by crystallization from acetone-hexane.

C. 17α-ETHINYL-3,5α-CYCLOESTRAN-17β-OL-6-ONE

To a solution of 17α-ethinyl-3,5α-cycloestrane-6β,17β-diol (2 g.) in acetone (200 ml.) at 0–5° C. add dropwise chromic acid-sulphuric acid reagent (8 N with respect to oxygen; 3.0 ml.) and then store the mixture overnight at 5° C. Pour the reaction mixture into water, filter the resultant precipitate, then wash with water and dry. Purify by crystallization from acetone-hexane to give 17α-ethinyl-3,5α-cycloestran-17β-ol-6-one.

EXAMPLE 4

17α-ethinyl-4-estren-17β-ol-6-one

Irradiate a solution of 17α-ethinyl-3,5α-cycloestran-17β-ol-6-one (4 g.) in dioxan (120 ml.) in the manner of Example 1. Isolate and purify the resultant product in the described manner to give 17α-ethinyl-4-estren-17β-ol-6-one.

EXAMPLE 5

17,20:20,21-bismethylenedioxy derivative of 5-pregnene-3β,17α,21-triol-11,20-dione

A. 5-PREGNENE-3β,17α,21-TRIOL-11,20-DIONE

Stir at room temperature for 18 hours a solution of 5-pregnene-3β,17α,21-triol-11,20-dione 21-acetate (1.0 g.) in methanolic perchloric acid (40 ml.; prepared from 39.0 ml. of methanol and 1.0 ml. of 70% perchloric acid). Then dilute the solution with water and filter. Wash the residue on the filter with water and dry to give 5-pregnene-3β,17α,21-triol-11,20-dione.

B. 17,20:20,21-BISMETHYLENEDIOXY DERIVATIVE OF 5-PREGNENE-3β,17α,21-TRIOL-11,20-DIONE

Prepare a solution of 5.0 g. of 5-pregnene-3β,17α,21-triol-11,20-dione (Part A of this example) in chloroform (200 ml.), 37% aqueous formaldehyde (50 ml.), concentrated hydrochloric acid (50 ml.) and stir the solution vigorously at room temperature for 48 hours. Add water to the reaction mixture and separate the layers. Dilute the lower layer with chloroform, and wash with 10% aqueous potassium hydroxide, then with water. Dry the solution (Na$_2$SO$_4$) and evaporate to a residue. Purify the residue by crystallization from acetone-hexane to give 17,20:20,21-bismethylenedioxy derivative of 5-pregnene-3β,17α,21-triol-11,20-dione.

EXAMPLE 6

17,20:20,21-bismethylenedioxy derivative of 5-pregnene-3β,11β,17α,21-tetrol-20-one To a stirred solution of 2 g. of the 17,20:20,21-bismethylenedioxy derivative of 5-pregnene-3β,17α,21-triol-11,20-dione in tetrahydrofuran (100 ml.) at 0–5° C. add lithium aluminum hydride (1.0 g.) in ether (100 ml.) and stir the mixture at 0–5° C. for one hour. Destroy the excess hydride by dropwise addition of ethyl acetate, and then add a saturated aqueous solution of sodium sulphate until the precipitated aluminum salts begin to coagulate. Add solid sodium sulphate, decant the supernatant liquid and evaporate to a residue substantially of 17,20:20,21-bismethylenedioxy derivative of 5-pregnene-3β,11β,17α,21-tetrol-20-one.

EXAMPLE 7

*17,20:20,21-bismethylenedioxy derivative of 3,5α-cyclopregnane-11β,17α,21-triol-6,20-dione*

A. 17,20 : 20,21-BISMETHYLENEDIOXY DERIVATIVE OF 5-PREGNENE - 3β,11β,17α,21 - TETROL-20-ONE 3β-TOSYLATE

To a solution of the 17,20:20,21-bismethylenedioxy derivative of 5-pregnene-3β,11β,17α,21-tetrol-20-one (5 g.) in pyridine (25 ml.) at 0–5° C. add p-toluenesulphonyl chloride (7.0 g.) and allow the reaction mixture to stand at 5° C. for 20 hours. Dilute the reaction mixture with water and filter the resultant precipitate. Wash the residue on the filter with water and dry to give 17,20:20,21-bismethylenedioxy derivative of 5-pregnene-3β,11β,17α,21-tetrol-20-one 3β-tosylate.

B. 17,20 : 20,21-BISMETHYLENEDIOXY DERIVATIVE OF 3,5α-CYCLOPREGNANE-6β,11β,17α,21-TETROL-20-ONE

Reflux for 90 minutes a solution of the 3β-tosylate prepared in Example 7A (1.0 g.) in acetone (20 ml.) and water (20 ml.) containing potassium acetate (1.4 g.). Isolate the resultant product in the manner of Example 3B to give 17,20:20,21-bismethylenedioxy derivative of 3,5α-cyclopregnane-6β,11β,17α,21-tetrol-20-one.

C. 17,20 : 20,21-BISMETHYLENEDIOXY DERIVATIVE OF 3,5α-CYCLOPREGNANE-11β,17α,21-TRIOL-6,20-DIONE

To a solution of the 3,5α-cyclopregnane prepared as in Example 7B (4.06 g.) in acetone (400 ml.) at 0–5° C., add chromic acid-sulphuric acid reagent (8 N with respect to oxygen; 0.25 ml.) and keep the solution at 0–5° C. for 18 hours. Isolate and purify the resultant product in the manner of Example 3C to give 17,20:20,21-bismethylenedioxy derivative of 3,5α-cyclopregnane-11β,17α,21-triol-6,20-dione.

EXAMPLE 8

*17,20:20,21-bismethylenedioxy derivative of 4-pregnene-11β,17α,21-triol-6,20-dione*

Irradiate an ethanolic solution of the 17,20:20,21-bismethylenedioxy derivative of 3,5α-cyclopregnane-11β,17α,21-triol-6,20-dione in the manner of Example 1 and isolate and purify the resultant product in the described manner to give 17,20:20,21-bismethylenedioxy derivative of 4-pregnene-11β,17α,21-triol-6,20-dione.

EXAMPLE 9

*4-pregnene-11β,17α,21-triol-6,20-dione 21-acetate*

Reflux a solution of the 17,20:20,21-bismethylenedioxy derivative of 4-pregnene-11β,17α,21-triol-6,20-dione (100 mg.) in 60% aqueous acetic acid (10 ml.) for 1 hour, and then dilute the mixture with water and filter, wash, and dry the resultant precipitate. Acetylate the dried precipitate with pyridine-acetic anhydride (10 ml. pyridine and 1 ml. acetic anhydride per gram of precipitate) at room temperature for 18 hours, and crystallize the resultant product from acetone-hexane to give 4-pregnene-11β,17α,21-triol-6,20-dione 21-acetate.

EXAMPLE 10

*17α-ethinyl-3,5α-cyclo-19-nor-androstane-6β,17β-diol 17-acetate*

A. 17α-ETHINYL-19-NOR-5-ANDROSTENE-3β,17β-DIOL 3-TOSYLATE 17-ACETATE

To a solution of 17α-ethinyl-19-nor-5-androstene-3β,17β-diol 17-acetate (1 g.) in pyridine (5 ml.) add p-toluenesulfonyl chloride (1.5 g.), at 0° C. Keep the solution at 0° C. for 30 minutes, and then store at 5° C. for 18 hours. Pour the reaction mixture into water and ice, and filter off the precipitated solid, wash with water, and dry in vacuo at room temperature to a residue comprising 17α-ethinyl-19-nor-5-androstene-3β,17β-diol 3-tosylate 17-acetate.

B. 17α-ETHINYL-3,5α-CYCLO-19-NOR-ANDROSTANE-6β,17β-DIOL 17-ACETATE

Dissolve the 3-tosylate (950 mg.) (prepared as in part A of this example) in acetone (20 ml.) and add a solution of potassium acetate (1.6 g.) in water (20 ml.). Reflux the mixture for 1½ hours, then cool and pour into water and ice. Filter the resultant suspension and wash the residue on the filter with water, dry, and subject to partition chromatography on a column of Chromosorb W, using the ligroin-propylene glycol system. After some initial oily fractions, a series of crystalline fractions is collected. Combine these crystalline fractions and crystallize from ether-hexane to give 17α-ethinyl-3,5α-cyclo-19-nor-androstane-6β,17β-diol 17-acetate, M.P. 154–156° C., [α]$_D$ −30° (CHCl$_3$).

EXAMPLE 11

*17α-ethinyl-3,5α-cyclo-19-nor-androstan-17β-ol-6-one 17-acetate*

To a solution of 17α-ethinyl-3,5α-cyclo-19-nor-androstane-6β,17β-diol 17-acetate (330 mg.) in acetone (20 ml.) at 0–5° C., add a solution of chromium-trioxide in sulfuric acid (Jones reagent) until a permanent orange color results. Leave the mixture at room temperature for 30 minutes, then add water. Filter off the resulting solid, wash with water, dry, and subject to partition chromatography on Chromosorb W, using the ligroin-propylene glycol system. Combine the crystalline fractions and crystallize from ether-hexane, to give 17α-ethinyl-3,5α-cyclo - 19 - nor -androstan - 17β - ol - 6 - one 17 - acetate, M.P. 160–163° C., [α]$_D$ −57°.

EXAMPLE 12

*17α-ethinyl-19-nor-4-androsten-17β-ol-6-one 17-acetate*

Irradiate a solution of 17α-ethinyl-3,5α-cyclo-19-nor-androstan-17β-ol-6-one 17-acetate (1.0 g.) in dioxan (150 ml.) in a quartz cell, at 26° C. with a 200 watt Hanovia mercury lamp for two hours, under nitrogen. Evaporate the solution to dryness in vacuo, and chromatograph the resultant residue on Florisil eluting with ether-hexane mixtures to give 17α-ethinyl-19-nor-4-androsten-17β-ol-6-one 17-acetate, M.P. 208–215° C., [α]$_D$ −60°.

EXAMPLE 13

*17α-chloroethinyl-19-nor-5-androstene-3β,17β-diol*

A. 17α-CHLOROETHINYL-19-NOR-3,5-ANDROSTADIENE-3,17β-DIOL DIACETATE

Dissolve 14.2 g. of 17α-chloroethinyl-19-nor-4-androsten-17β-ol-3-one in 142 ml. of acetic anhydride to which has been added 1.42 g. of p-toluenesulfonic acid. Heat the solution on a steam bath for one hour; then cool and pour into ice water. Neutralize the reaction mixture with 10% aqueous potassium bicarbonate. Filter the resultant precipitate of 17α-chloroethinyl-19-nor-3,5-androstadiene-3,17β-diol diacetate, wash with water, and dry. Purify by crystallization from methanol.

B. 17α-CHLOROETHINYL-19-NOR-5-ANDROSTENE-3β,17β-DIOL 17-ACETATE

Dissolve 7 g. of 17α-chloroethinyl-19-nor-3,5-androstadiene-3,17β-diol diacetate in 250 ml. of dimethyl formamide and add 4.13 g. of sodium borohydride in 63 ml. of water. Heat the reaction mixture on a steam bath for 10 minutes, cool and pour into water. Bring the reaction mixture to neutrality with glacial acetic acid. Filter the resultant precipitate of substantially 17α-chloroethinyl-19-nor-5-androstene-3β,17β-diol 17-acetate. Wash with water and dry. Purify by crystallization from methanol.

C. 17α-CHLOROETHINYL-19-NOR-5-ANDROSTENE-3β,17β-DIOL

In a manner similar to that described in Example 6, treat 17α - chloroethinyl - 19 - nor - 5 - androstene - 3β, 17β-diol 17-acetate in tetrahydrofuran with lithium aluminum hydride in ether. Isolate the resultant product in the described manner to obtain 17α-chloroethinyl-19-nor-5-androstene-3β,17β-diol.

In a manner similar to that described in above procedures A, B, and C, 17α-chloroethinyl-4-androsten-17β-ol-3-one is reacted with p-toluenesulfonic acid in acetic anhydride to obtain 17α-chloroethinyl-3,5-androstadiene-3,17β-diol diacetate which, in turn, is reacted with sodium borohydride in dimethyl formamide to give 17α-chloroethinyl-5-androstene-3β,17β-diol 17-acetate, which is then reduced with lithium aluminum hydride in tetrahydrofuran to give 17α-chloroethinyl-5-androstene-3β,17β-diol.

EXAMPLE 14

*17α-chloroethinyl-19-nor-4-androsten-17β-ol-6-one 17-acetate*

A. 17α-CHLOROETHINYL-19-NOR-5-ANDROSTENE-3β,17β-DIOL 3-p-TOLUENESULFONATE 17-ACETATE

In a manner similar to that described in Example 3A, treat 17α-chloroethinyl-19-nor-5-androstene-3β,17β-diol 17-acetate in pyridine with p-toluenesulfonyl chloride. The resultant product is isolated in the manner described to give 17α-chloroethinyl-19-nor-5-androstene-3β,17β-diol 3-p-toluenesulfonate 17-acetate.

Similarly, 17α-chloroethinyl-5-androstene-3β,17β-diol 17-acetate, 17α-chloroethinyl-19-nor-5-androstene-3β,17β-diol, 17α-chloroethinyl-5-androstene-3β,17β-diol, 17α-methyl-19-nor-5-androstene-3β,17β-diol, and 17α-methyl-5-androstene-3β,17β-diol are each reacted with p-toluenesulfonyl chloride in pyridine to obtain the respective 3-p-toluenesulfonate esters, i.e., 17α-chloroethinyl-5-androstene-3β,17β-diol 3-p-toluenesulfonate 17-acetate, 17α-chloroethinyl-19-nor-5-androstene-3β,17β-diol 3-p-toluenesulfonate, 17α-chloroethinyl-5-androstene-3β,17β-diol 3-p-toluenesulfonate, 17α-methyl-19-nor-5-androstene-3β,17β-diol 3-p-toluenesulfonate, and 17α-methyl-5-androstene-3β,17β-diol-3-p-toluenesulfonate.

B. 17α-CHLOROETHINYL-19-NOR-3,5α-CYCLOANDROSTANE-6β,17β-DIOL 17-ACETATE

In a manner similar to that described in Example 3B, treat 17α-chloroethinyl-19-nor-5-androstene-3β,17β-diol 3-p-toluenesulfonate 17-acetate with potassium acetate in acetone. Isolate the resultant product in the described manner to give 17α-chloroethinyl-19-nor-3,5α-cycloandrostane-6β,17β-diol 17-acetate.

In a similar manner treat each of 17α-chloroethinyl-5-androstene-3β,17β-diol 3-p-toluenesulfonate 17-acetate, 17α-chloroethinyl-19-nor-5-androstene-3β,17β-diol 3-p-toluenesulfonate, 17α-chloroethinyl-5-androstene-3β,17β-diol 3-p-toluenesulfonate, 17α-methyl-19-nor-5-androstene-3β,17β-diol 3-p-toluenesulfonate, and 17α-methyl-5-androstene-3β,17β-diol 3-p-toluenesulfonate with potassium acetate in acetone to obtain, respectively, 17α-chloroethinyl-3,5α-cycloandrostane-6β,17β-diol 17-acetate, 17α-chloroethinyl-19-nor-3,5α-cycloandrostane-6β,17β-diol, 17α-chloroethinyl-3,5α-cycloandrostane-6β,17β-diol, 17α-methyl-19-nor-3,5α-cycloandrostane-6β,17β-diol, and 17α-methyl-3,5α-cycloandrostane-6β,17β-diol.

C. 17α-CHLOROETHINYL-19-NOR-3,5α-CYCLOANDROSTAN-17β-OL-6-ONE 17-ACETATE

In a manner similar to that described in Example 3C, treat 17α-chloroethinyl-19-nor-3,5α-cycloandrostane-6β,17β-diol 17-acetate in acetone with chromic acid in sulfuric acid reagent. Isolate the resultant product in the described manner to give 17α-chloroethinyl-19-nor-3,5α-cycloandrostan-17β-ol-6-one 17-acetate.

Similarly, 17α-chloroethinyl-3,5α-cycloandrostane-6β,17β-diol 17-acetate, 17α-chloroethinyl-19-nor-3,5α-cycloandrostane-6β,17β-diol, 17α-chloroethinyl-3,5α-cycloandrostane-6β,17β-diol, 17α-methyl-19-nor-3,5α-cycloandrostane-6β,17β-diol, and 17α-methyl-3,5α-cycloandrostane-6β,17β-diol are each reacted with chromic acid/sulfuric acid reagent to give, respectively, 17α-chloroethinyl-3,5α-cycloandrostan-17β-ol-6-one 17-acetate, 17α-chloroethinyl-19-nor-3,5α-cycloandrostan-17β-ol-6-one, 17α-chloroethinyl-3,5α-cycloandrostan-17β-ol-6-one, 17α-methyl-19-nor-3,5α-cycloandrostan-17β-ol-6-one and 17α-methyl-3,5α-cycloandrostan-17β-ol-6-one.

D. 17α-CHLOROETHINYL-19-NOR-4-ANDROSTEN-17β-OL-6-ONE 17-ACETATE

In a manner similar to that described in Example 1, irradiate a dioxane solution of 17α-chloroethinyl-19-nor-3,5α-cycloandrostan-17β-ol-6-one 17-acetate with a 250 watt mercury lamp. Isolate the resultant product in the described manner to give 17α-chloroethinyl-19-nor-4-androsten-17β-ol-6-one 17-acetate.

Similarly, dioxan solutions of 17α-chloroethinyl-3,5α-cycloandrostan-17β-ol-6-one 17-acetate, 17α-chloroethinyl-19-nor-3,5α-cycloandrostan-17β-ol-6-one, 17α-chloroethinyl-3,5α-cycloandrostan-17β-ol-6-one, 17α-methyl-19-nor-3,5α-cycloandrostan-17β-ol-6-one and 17α-methyl-3,5α-cycloandrostan-17β-ol-6-one are each irradiated with ultraviolet light to give, respectively, 17α-chloroethinyl-4-androsten-17β-ol-6-one 17-acetate, 17α-chloroethinyl-19-nor-4-androsten-17β-ol-6-one, 17α-chloroethinyl-4-androsten-17β-ol-6-one, 17α-methyl-19-nor-4-androsten-17β-ol-6-one, and 17α-methyl-4-androsten-17β-ol-6-one.

EXAMPLE 15

*4-pregnene-6,20-dione*

A. 20-ETHYLENEDIOXY-5-PREGNEN-3β-OL

Dissolve 1 g. of 5-pregnen-3β-ol-20-one in 75 ml. of benzene and add 7.5 ml. of ethylene glycol together with 50 mg. of p-toluenesulfonic acid. Heat the reaction mixture at reflux with a water separator for 20 hours. Cool the reaction mixture and add about 10 ml. of saturated sodium bicarbonate solution. Extract the reaction mixture with ether, wash the combined extracts with water, dry over sodium sulfate, and evaporate to a residue comprising 20-ethylenedioxy-5-pregnen-3β-ol.

B. 20-ETHYLENEDIOXY-5-PREGNEN-3β-OL 3-p-TOLUENESULFONATE

In a manner similar to that described in Example 3A, treat 20-ethylenedioxy-5-pregnen-3β-ol with p-toluenesulfonyl chloride in pyridine. Isolate the resultant product in the described manner to give 20-ethylenedioxy-5-pregnen-3β-ol 3-p-toluenesulfonate.

C. 20-ETHYLENEDIOXY-3,5α-CYCLOPREGNAN-6β-OL

In a manner similar to that described in Example 3β, treat 20-ethylenedioxy-5-pregnen-3β-ol 3-p-toluenesulfonate with potassium acetate in aqueous acetone. Isolate and purify the resultant product in the described manner to give 20-ethylenedioxy-3,5α-cyclopregnan-6β-ol.

D. 20-ETHYLENEDIOXY-3,5α-CYCLOPREGNAN-6-ONE

In a manner similar to that described in Example 3C, treat 20-ethylenedioxy-3,5α-cyclopregnan-6β-ol with chromic acid in sulfuric acid reagent. Isolate the resultant product and purify in the described manner to give 20-ethylenedioxy-3,5α-cyclopregnan-6-one.

E. 20-ETHYLENEDIOXY-4-PREGNEN-6-ONE

In a manner similar to that described in Example 1, irradiate a solution of 20-ethylenedioxy-3,5α-cyclopregnan-6-one in dioxan with a 250 watt mercury lamp. Isolate and purify the resultant product in the described manner to give 20-ethylenedioxy-4-pregnen-6-one.

F. 4-PREGNENE-6,20-DIONE

Reflux a solution of 100 mg. of 20-ethylenedioxy-4-pregnen-6-one in 10 ml. of 60% aqueous acetic acid for one hour. Dilute the mixture with water, and filter, wash and dry the resultant precipitate comprising 4-pregnene-6,20-dione. Purify by crystallization from acetone-hexane.

In a similar manner, by going through a sequence of reactions similar to those described in Examples 15A through 15F, 16α-methyl-5-pregnene-3β-ol-20-one, 16β- methyl-5-pregnene-3β-ol-20-one, 5-pregnene-3β,17α-diol-20-one, 16β-methyl-5-pregnene-3β,17α-diol-20-one, and 16α-methyl-5-pregnene-3β,17α-diol-20-one are each reacted with ethylene glycol in the presence of p-toluenesulfonic acid to obtain the corresponding respective 20-ethylene ketal derivatives, each of which are then reacted with p-toluenesulfonyl chloride in pyridine to obtain, respectively, 16α-methyl-20-ethylenedioxy-5-pregnene-3β-ol 3-p-toluenesulfonate, 16β - methyl - 20-ethylenedioxy-5-pregnene-3β-ol 3-p-toluenesulfonate, 20-ethylenedioxy-5-pregnene-3β,17α-diol 3-p-toluenesulfonate, 16β-methyl-20-ethylenedioxy - 5-pregnene-3β,17α-diol 3-p-toluenesulfonate, and 16α-methyl-20-ethylenedioxy-5-pregnene-3β,17α-diol 3-p-toluenesulfonate. Reaction of each of the aforementioned 3-p-toluenesulfonate ester derivatives with potassium acetate in acetone yields, respectively, 16α-methyl-20 - ethylenedioxy-3,5α-cyclopregnane-6β-ol, 16β-methyl-20-ethylenedioxy-3,5α-cyclopregnane-6β-ol, 20-ethylenedioxy-3,5α-cyclopregnane-6β,17α-diol, 16β-methyl-20-ethylenedioxy-3,5α-cyclopregnane-6β,17α-diol, and 16α-methyl-20-ethylenedioxy-3,5α-cyclopregnane-6β,17α-diol. Oxidation of the 6β-hydroxy function of each of the foregoing is effected with chromic acid and sulfuric acid according to the procedure of Example 15D to obtain, respectively, 16α - methyl-20-ethylenedioxy-3,5α-cyclopregnane-6-one, 16β-methyl-20-ethylenedioxy-3,5α-cyclopregnane-6-one, 20-ethylenedioxy-3,5α-cyclopregnane-17α-ol-6-one, 16β-methyl-20-ethylenedioxy-3,5α-cyclopregnane-17α-ol-6-one and 16α-methyl-20-ethylenedioxy-3,5α-cyclopregnane-17α-ol-6-one. Irradiation of a dioxan solution of each of the 3,5α-cyclopregnane-6-one derivatives yields, respectively, 16α - methyl-20-ethylenedioxy-4-pregnene-6-one, 16β-methyl-20-ethylenedioxy-4-pregnene-6-one, 20-ethylenedioxy - 4-pregnene-17α-ol-6-one, 16β-methyl-20-ethylenedioxy-4-pregnene-17α-ol-6-one and 16α-methyl-20-ethylenedioxy-4-pregnene-17α-ol-6-one. Hydrolysis of each of the 20-ethylene ketal derivatives is effected by means of 60% aqueous acetic acid in the manner described in Example 15F to obtain, respectively, 16α-methyl-4-pregnene - 6,20-dione, 16β-methyl-4-pregnene-6,20-dione, 4-pregnene-17α-ol-6,20-dione, 16β-methyl-4-pregnene-17α-ol-6,20-dione and 16α-methyl-4-pregnene-17α-ol-6,20-dione.

EXAMPLE 16

*17α-ethinyl-3,5α-cycloandrostan-17β-ol-6,11-diones*

A. 17α-ETHINYL-3,5-ANDROSTADIENE-3,11β,17β-TRIOL TRIACETATE ESTERS

In a manner similar to that described in Example 13A, treat 9α-fluoro-17α-ethinyl-4-androstene-11β,17β-diol-3-one with acetic anhydride in p-toluenesulfonic acid. Isolate and purify the resultant product in the described manner to give 9α-fluoro-17α-ethinyl-3,5-androstadiene-3,11β,17β-triol triacetate.

In a similar manner, each of

16α-methyl-17α-ethinyl-4-androstene-11β,17β-diol-3-one,
16β-methyl-17α-ethinyl-4-androstene-11β,17β-diol-3-one,
9α-fluoro-16α-methyl-17α-ethinyl-4-androstene-11β,17β-diol-3-one,
9α-fluoro-16α-ethyl-17α-ethinyl-4-androstene-11β,17β-diol-3-one,
9α-fluoro-16β-ethyl-17α-ethinyl-4-androstene-11β,17β-diol-3-one,
16α-methyl-17α-propinyl-4-androsten-17β-ol-3,11-dione,
16β-methyl-17α-propinyl-4-androsten-17β-ol-3,11-dione, and
9α-fluoro-16α-methyl-17α-propinyl-4-androstene-11β,17β-diol-3-one are reacted with acetic anhydride and p-toluenesulfonic acid in the above-described manner to give, respectively, 16α-methyl-17α-ethinyl-3,5-androstadiene-3,11β,17β-triol triacetate,
16β-methyl-17α-ethinyl-3,5-androstadiene-3,11β,17β-triol triacetate,
9α-fluoro-16α-methyl-17α-ethinyl-3,5-androstadiene-3,11β,17β-triol triacetate,
9α-fluoro-16α-ethyl-17α-ethinyl-3,5-androstadiene-3,11β,17β-triol triacetate,
9α-fluoro-16β-ethyl-17α-ethinyl-3,5-androstadiene-3,11β,17β-triol triacetate,
16α-methyl-17α-propinyl-3,5-androstadiene-3,17β-diol-11-one diacetate,
16β-methyl-17α-propinyl-3,5-androstadiene-3,17β-diol-11-one diacetate, and
9α-fluoro-16α-methyl-17α-propinyl-3,5-androstadiene-3,11β,17β-triol triacetate.

B. 17α-ETHINYL-5-ANDROSTENE-3β,11β,17β-TRIOL 11,17-DIACETATE ESTERS

In a manner similar to that described in Example 13B, treat each of the 17α-ethinyl-3,5-androstadienes prepared in the preceding example with sodium borohydride in dimethylformamide. Isolate and purify the resultant products to give 9α-fluoro-17α-ethinyl-5-androstene-3β,11β,17β-triol 11,17-diacetate,
16α-methyl-5-androstene-3β,11β,17β-triol 11,17-diacetate,
16β-methyl-17α-ethinyl-5-androstene-3β,11β,17β-triol 11,17-diacetate,
9α-fluoro-16α-methyl-17α-ethinyl-5-androstene-3β,11β,17β-triol 11,17-diacetate,
9α-fluoro-16α-ethyl-17α-ethinyl-5-androstene-3β,11β,17β-triol 11,17-diacetate,
9α-fluoro-16β-ethyl-17α-ethinyl-5-androstene-3β,11β,17β-triol 11,17-diacetate,
16α-methyl-17α-propinyl-5-androstene-3β,17β-diol-11-one 17-acetate,
16β-methyl-17α-propinyl-5-androstene-3β,17β-diol-11-one 17-acetate, and
9α-fluoro-16α-methyl-17α-propinyl-5-androstene-3β,11β,17β-triol 11,17-diacetate, respectively.

C. 17α-ETHINYL-5-ANDROSTENE-3β,11β,17β-TRIOLS

In a manner similar to that described in Example 13C, treat each of the 17α-ethinyl-5-androstenes prepared in Example 16B with lithium aluminum hydride in ether. Isolate the resultant products in the described manner to give 9α-fluoro-17α-ethinyl-5-androstene-3β,11β,17β-triol,
16α-methyl-17α-ethinyl-5-androstene-3β,11β,17β-triol,
16β-methyl-17α-ethinyl-5-androstene-3β,11β,17β-triol,
9α-fluoro-16α-methyl-17α-ethinyl-5-androstene-3β,11β,17β-triol,
9α-fluoro-16α-ethyl-17α-ethinyl-5-androstene-3β,11β,17β-triol,
9α-fluoro-16β-ethyl-17α-ethinyl-5-androstene-3β,11β,17β-triol
16α-methyl-17α-propinyl-5-androstene-3β,11β,17β-triol,
16β-methyl-17α-propinyl-5-androstene-3β,11β,17β-triol, and
9α-fluoro-16α-methyl-17α-propinyl-5-androstene-3β,11β,17β-triol, respectively.

D. 17α-ETHINYL-5-ANDROSTENE-3β,11β,17β-TRIOL 3-p-TOLUENESULFONATE ESTERS

In a manner similar to that described in Example 3A, esterify each of the 3-hydroxy-17α-ethinyl-5-androstenes prepared in Example 16C by means of p-toluenesulfonyl chloride in pyridine. Isolate the resultant respective products in the described manner to give 9α-fluoro-17α-ethinyl-5-androstene-3β,11β,17β-triol 3-p-toluenesulfonate,
16α-methyl-17α-ethinyl-5-androstene-3β,11β,17β-triol 3-p-toluenesulfonate,
16β-methyl-17α-ethinyl-5-androstene-3β,11β,17β-triol 3-p-toluenesulfonate,
9α-fluoro-16α-methyl-17α-ethinyl-5-androstene-3β,11β,17β-triol 3-p-toluenesulfonate,
9α-fluoro-16α-ethyl-17α-ethinyl-5-androstene-3β,11β,17β-triol 3-p-toluenesulfonate, 9α-fluoro-16β-ethyl-17α-ethinyl-5-androstene-3β,11β,17β-triol 3-p-toluenesulfonate,
16α-methyl-17α-propinyl-5-androstene-3β,11β,17β-triol 3-p-toluenesulfonate,
16β-methyl-17α-propinyl-5-androstene-3β,11β,17β-triol 3-p-toluenesulfonate, and
9α-fluoro-16α-methyl-17α-propinyl-5-androstene-3β,11β,17β-triol 3-p-toluenesulfonate, respectively.

E. 17α-ETHINYL-3,5α-CYCLOANDROSTANE-6β,11β,17β-TRIOLS

In a manner similar to that described in Example 3B, treat each of the 17α-ethinyl-5-androstene-3β,11β,17β-triol 3-p-toluenesulfonate esters prepared in Example 16D with aqueous acetone containing potassium acetate. Isolate and purify the resultant respective products in the described manner to give, respectively, 9α-fluoro-17α-ethinyl-3,5α-cycloandrostane-6β,11β,17β-triol,
16α-methyl-17α-ethinyl-3,5α-cycloandrostane-6β,11β,17β-triol,
16β-methyl-17α-ethinyl-3,5α-cycloandrostane-6β,11β,17β-triol,
9α-fluoro-16α-methyl-17α-ethinyl-3,5α-cycloandrostane-6β,11β,17β-triol,
9α-fluoro-16α-ethyl-17α-ethinyl-3,5α-cycloandrostane-6β,11β,17β-triol,
9α-fluoro-16β-ethyl-17α-ethinyl-3,5α-cycloandrostane-6β,11β,17β-triol,
16α-methyl-17α-propinyl-3,5α-cycloandrostane-6β,11β,17β-triol,
16β-methyl-17α-propinyl-3,5α-cycloandrostane,-6β,11β,17β-triol, and
9α-fluoro-16α-methyl-17α-propinyl-3,5α-cycloandrostane-6β,11β,17β-triol.

F. 17α-ETHINYL-3,5α-CYCLOANDROSTAN-17β-OL-6,11-DIONES

In a manner similar to that described in Example 3C, oxidize each of the 17α-ethinyl-3,5α-cycloandrostane-6β,11β,17β-triols prepared in Example 16E in acetone with chromic acid-sulfuric acid reagent. Isolate and purify the respective resultant products in the described manner to give 9α-fluoro-17α-ethinyl-3,5α-cycloandrostan-17β-ol-6,11-dione,
16α-methyl-17α-ethinyl-3,5α-cycloandrostan-17β-ol-6,11-dione,
16β-methyl-17α-ethinyl-3,5α-cycloandrostan-17β-ol-6,11-dione,
9α-fluoro-16α-methyl-17α-ethinyl-3,5α-cycloandrostan-17β-ol-6,11-dione,
9α-fluoro-16α-ethyl-17α-ethinyl-3,5α-cycloandrostan-17β-ol-6,11-dione,
9α-fluoro-16β-ethyl-17α-ethinyl-3,5α-cycloandrostan-17β-ol-6,11-dione,
16α-methyl-17α-propinyl-3,5α-cycloandrostan-17β-ol-6,11-dione,
16β-methyl-17α-propinyl-3,5α-cycloandrostan-17β-ol-6,11-dione, and
9α-fluoro-16α-methyl-17α-propinyl-3,5α-cycloandrostan-17β-ol-6,11-dione, respectively.

EXAMPLE 17

*17α-ethinyl-4-androsten-17β-ol-6,11-diones*

In a manner similar to that described in Example 1, irradiate a dioxan solution of each of 9α-fluoro-17α-ethinyl-3,5α-cycloandrostan-17β-ol-6,11-dione,
16α-methyl-17α-ethinyl-3,5α-cycloandrostan-17β-ol-6,11-dione,
16β-methyl-17α-ethinyl-3,5α-cycloandrostan-17β-ol-6,11-dione,
9α-fluoro-16α-methyl-17α-ethinyl-3,5α-cycloandrostan-17β-ol-6,11-dione,
9α-fluoro-16α-ethyl-17α-ethinyl-3,5α-cycloandrostan-17β-ol-6,11-dione,
9α-fluoro-16β-ethyl-17α-ethinyl-3,5α-cycloandrostan-17β-ol-6,11-dione,
16α-methyl-17α-propinyl-3,5α-cycloandrostan-17β-ol-6,11-dione,
16β-methyl-17α-propinyl-3,5α-cycloandrostan-17β-ol-6,11-dione, and
9α-fluoro-16α-methyl-17α-propinyl-3,5α-cycloandrostan-17β-ol-6,11-dione using a Hanovia 250 watt mercury lamp. Isolate and purify the resultant respective products in the manner described to give 9α-fluoro-17α-ethinyl-4-androsten-17β-ol-6,11-dione,
16α-methyl-17α-ethinyl-4-androsten-17β-ol-6,11-dione,
16β-methyl-17α-ethinyl-4-androsten-17β-ol-6,11-dione,
9α-fluoro-16α-methyl-17α-ethinyl-4-androsten-17β-ol-6,11-dione,
9α-fluoro-16α-ethyl-17α-ethinyl-4-androsten-17β-ol-6,11-dione,
9α-fluoro-16β-ethyl-17α-ethinyl-4-androsten-17β-ol-6,11-dione,
16α-methyl-17α-propinyl-4-androsten-17β-ol-6,11-dione,
16β-methyl-17α-propinyl-4-androsten-17β-ol-6,11-dione, and
9α-fluoro-16α-methyl-17α-propinyl-4-androsten-17β-ol-6,11-dione, respectively.

EXAMPLE 18

*4-pregnen-21-ol-6,20-dione*

In a manner similar to that described in Example 15A, treat 5-pregnene-3β,21-diol-20-one 21-acetate with ethylene glycol and p-toluenesulfonic acid and isolate the resultant product in the described manner to obtain 20-ethylenedioxy-5-pregnene-3β,21-diol 21-acetate.

In a manner similar to that described in Example 3A, treat 20-ethylenedioxy-5-pregnene-3β,21 - diol 21 - acetate with p-toluenesulfonyl chloride in pyridine and isolate the resultant product in the described manner to obtain 20-ethylenedioxy-5-pregnene-3β-21-diol 3-p-toluenesulfonate 21-acetate.

In a manner similar to that described in Example 3B, treat 20-ethylenedioxy-5-pregnene-3β,21-diol 3-p-toluenesulfonate 21-acetate with potassium acetate in aqueous acetone. Isolate and purify the resultant product in the described manner to obtain 20-ethylenedioxy-3,5α-cyclopregnane-6β,21-diol 21-acetate.

In a manner similar to that described in Example 3C, oxidize 20-ethylenedioxy-3,5α-cyclopregnane - 6β,21 - diol 21-acetate with chromic acid in sulfuric acid. Isolate and purify the resultant product in the described manner to obtain 20-ethylenedioxy-3,5α-cyclopregnan-21-ol - 6 - one 21-acetate.

In a manner similar to that described in Example 1, irradiate a dioxan solution of 20-ethylenedioxy-3,5α-cyclopregnan-21-ol-6-one 21-acetate with a 250 watt mercury arc lamp. Isolate and purify the resultant product in the described manner to obtain 20-ethylenedioxy-4-pregnen-21-ol-6-one 21-acetate.

In a manner similar to that described in Example 15F, reflux a solution of 20-ethylenedioxy-4-pregnen-21-ol-6-one 21-acetate in 60% aqueous acetic acid and isolate and purify the resultant product in a manner similar to that described to obtain 4-pregnen-21-ol-6,20-dione.

EXAMPLE 19

*4-pregene-16α,17α-diol-6,20-dione*

A. 16α,17α-ISOPROPYLIDENEDIOXY-20-ETHYLENEDIOXY-4-PREGNEN-6-ONE

In a manner similar to that described in Example 15A through 15E, react 16α,17α-isopropylidenedioxy-5-pregnen-3β-ol-20-one with ethylene glycol in the presence of p-toluenesulfonic acid to obtain 16α,17α-isopropylidenedioxy-20-ethylenedioxy-5-pregnen-3β-ol. Treat the 20-ethylenedioxy ketal derivative with p-toluenesulfonyl chloride in pyridine and isolate the resultant product to obtain 16α,17α-isopropylidenedioxy-20 - ethylenedioxy - 5 - pregnen-3β-ol 3-p-toluenesulfonate, which upon treatment with potassium acetate in acetone is converted to 16α,17α-isopropylidenedioxy - 20 - ethylenedioxy - 3,5α - cyclopregnan-6β-ol which, in turn, is oxidized in chromic acid in sulfuric acid to obtain 16α,17α-isopropylidenedioxy-20-ethylenedioxy-3,5α-cyclopregnan-6-one. Irradiation of the aforementioned 3,5α-cyclopregnan-6-one derivative in dioxan with a 250 watt mercury arc lamp in the manner of Example 1 yields 16α,17α-isopropylidenedioxy-20-ethylenedioxy-4-pregnan-6-one.

B. 4-PREGNANE-16α,17α-DIOL-6,20-DIONE

Dissolve 1 g. of 16α,17α - isopropylidenedioxy - 20-ethylenedioxy-4-pregnan-6-one in refluxing 60% formic acid. Heat under reflux for 30 minutes; then cool the mixture and dilute with water. Filter off the resultant precipitate, wash with water, and dry in vacuo. Chromatograph the solid over Florisil, eluting with ether. Combine the ether eluates and evaporate in vacuo to a residue substantially of 4-pregnene-16α,17α-diol-6,20-dione.

EXAMPLE 20

*4-pregnen-16α-ol-6,20-dione*

A. 16α-BENZYLOXY-20-ETHYLENEDIOXY-3,5α-CYCLOPREGNAN-6-ONE

In a manner similar to that described in Example 15B through 15D, 16α-benzyloxy-20-ethylenedioxy-5-pregnen-3β-ol is reacted with p-toluenesulfonyl chloride in pyridine and the resultant 3-p-toluenesulfonate ester, i.e., 16α - benzyloxy - 20 - ethylenedioxy - 5 - pregnen-3β-ol 3-p-toluenesulfonate, is reacted with potassium acetate in acetone to obtain 16α-benzyloxy-20-ethylenedioxy-3,5α-cyclopregnan-6β-ol. Oxidize the 6β-hydroxy function with chromic acid in sulfuric acid to obtain 16α-benzyloxy-20-ethylenedioxy-3,5α-cyclo-pregnan-6-one.

B. 20-ETHYLENEDIOXY-3,5α-CYCLO-PREGNAN-16α-OL-6-ONE

To 1 g. of 16α - benzyloxy - 20 - ethylenedioxy-3,5α-cyclopregnan-6-one in 40 ml. of ethanol add 8 g. of Raney nickel. Reflux the mixture for 8 hours; then cool and filter. Evaporate the filtrate in vacuo to a residue of 20-ethylenedioxy-3,5α-cyclopregnan-16α-ol-6-one.

C. 20-ETHYLENEDIOXY-4-PREGNEN-16α-OL-6-ONE

In a manner similar to that described in Example 1, irradiate a dioxan solution of 20-ethylenedioxy-3,5α-cyclopregnan-16α-ol-6-one with a 250 watt mercury arc lamp. Isolate and purify the resultant product in a manner similar to that described to obtain 20-ethylenedioxy-4-pregnen-16α-ol-6-one.

D. 4-PREGNEN-16α-OL-6,20-DIONE

In a manner similar to that described in Example 15F, treat 20 - ethylenedioxy - 4 - pregnen - 16α - ol - 6 - one in 60% aqueous acetic acid and isolate the resultant product in the described manner to obtain 4-pregnen-16α-ol-6,20-dione.

I claim:

1. A compound selected from the group consisting of 6-keto-Δ⁴-steroids of the following formula:

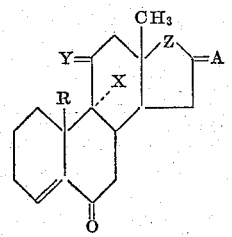

wherein A is a member selected from the group consisting of hydrogen, methylene, (H, α-lower alkyl), (H, β-lower alkyl), and (H, αOH); R is a member selected from the group consisting of hydrogen and methyl; X is a member selected from the group consisting of hydrogen and halogen; Y is a member selected from the group consisting of keto, (H, βOH) and hydrogen; and when Y is hydrogen, X is hydrogen; and Z is a member selected from the group consisting of

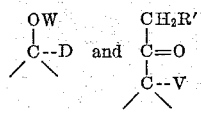

W being a member selected from the group consisting of hydrogen and lower alkanoyl; D being a member selected from the group consisting of hydrogen, lower alkyl, ethinyl, methylethinyl, and halogenoethinyl; R' being a member selected from the group consisting of hydrogen, hydroxy, an acyloxy residue of an acid selected from the group consisting of sulfuric acid, phosphoric acid, and a hydrocarbon carboxylic acid having up to 12 carbon atoms; V being a member selected from the group consisting of hydroxy, lower alkanoyloxy, and, when R' is a member of the group consisting of hydroxy and an acyloxy residue of an acid of the group consisting of sulfuric acid, phosphoric acid, and a carboxylic acid having up to 12 carbon atoms, hydrogen; and when V is hydroxy and A is (H, αOH), the 16α,17α-alkylidenedioxy derivatives thereof.

2. 17α-ethinyl-4-androsten-17β-ol-6-one.
3. 17α-ethinyl-19-nor-4-androsten-17β-ol-6-one.
4. 4-pregnene-11β,17α,21-triol-6,20-dione.
5. 17α-methyl-4-androsten-17β-ol-6-one.
6. 17α,20;20,21-bis-methylenedioxy-4-pregnen-11β-ol-6-one.
7. 4-androsten-17β-ol-6-one 17-acetate.
8. 17α,20;20,21-bis-methylenedioxy-3,5α-cyclopregnane-6β,11β-diol.
9. 17α-methyl-19-nor-3,5α-cycloandrostane-6β,17β-diol.
10. 17α,20;20,21-bis-methylenedioxy-3,5α-cyclopregnan-11β-ol-6-one.
11. 17α-methyl-19-nor-3,5α-cycloandrostan-17β-ol-6-one.
12. The process for preparing a 6-keto-Δ⁴-cyclopentanophenanthrene having from 18 to 21 nuclear carbon atoms which comprises irradiating with ultraviolet light a 6-keto-3,5α-cyclo-cyclopentanophenanthrene having from 18 to 21 nuclear carbon atoms, said 6-keto-3,5α-cyclo-cyclopentanophenanthrene having all reactive ketones other than at C–6 protected by a ketone derivative.
13. In the process for preparing a 6-keto-Δ⁴-cyclopentanophenanthrene of the following structural formula:

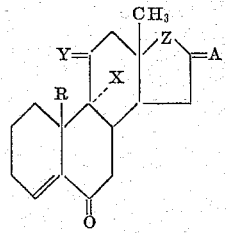

wherein A is a member selected from the group consisting of hydrogen, methylene, (H, α-lower alkyl), (H β-lower alkyl) and (H, αOH); R is a member selected from the group consisting of hydrogen and methyl; X is a member selected from the group consisting of hydrogen and halogen; Y is a member selected from the group consisting of keto, (H, βOH), and hydrogen, and when Y is hydrogen, X is hydrogen; and Z is a member selected from the group consisting of

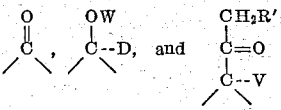

D being a member selected from the group consisting of hydrogen, lower alkyl, ethinyl, methylethinyl, and halogenoethinyl; W being a member selected from the group consisting of hydrogen, and lower alkanoyl; V being a member selected from the group consisting of hydrogen, hydroxy, and lower alkanoyloxy; and R' is a member selected from the group consisting of hydrogen, hydroxy, and an acyloxy residue of an acid selected from the group consisting of a hydrocarbon carboxylic acid having up to 12 carbon atoms, sulfuric acid and phosphoric acid; and when V is hydroxy, and A is (H, αOH), the 16α,17α-alkylidenedioxy derivaties thereof; the step which comprises irradiating with ultraviolet light a 6-keto-3,5α-cyclosteroid of the following formula:

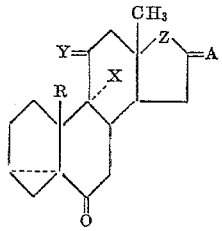

wherein A, R, X, Y, and Z are as defined hereinabove, said 3,5α-cyclo-steroid having all reactive ketones other than at C–6 protected by a ketone derivative and said 3,5α-cyclo-steroid being dissolved in a non-reactive solvent.

14. The process for preparing 17α-ethinyl-19-nor-4-androsten-17β-ol-6-one 17-acetate which comprises irradiating with ultraviolet light a dioxan solution of 17α-ethinyl-19-nor-3-,5α-cycloandrostan-17β-ol-6-one 17 - acetate.

15. A compound selected from the group consisting of 19-nor-3,5α-cycloandrostanes of the following structural formula:

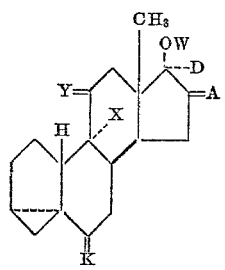

wherein A is a member selected from the group consisting of hydrogen, methylene, (H, α-lower alkyl), (H, β-lower alkyl), and (H, αOH); K is a member selected from the group consisting of (H, βOH) and keto; D is a member selected from the group consisting of lower alkyl, methylethinyl, and halogenoethinyl; X is a member selected from the group consisting of hydrogen and halogen; Y is a member selected from the group consisting of keto, (H, βOH) and hydrogen; and when Y is hydrogen, X is hydrogen; and W is a member selected from the group consisting of hydrogen and lower alkanoyl.

16. A compound selected from the group consisting of 3,5α-cyclopregnanes of the following structural formula:

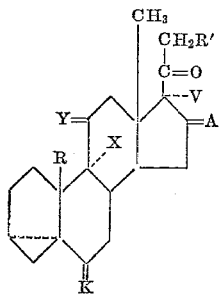

wherein A is a member selected from the group consisting of hydrogen, methylene, and (H, αOH); R is a member selected from the group consisting of hydrogen and methyl; X is a member selected from the group consisting of hydrogen and halogen; Y is a member selected from the group consisting of keto, (H, βOH) and hydrogen; and when Y is hydrogen, X is hydrogen; K is a member selected from the group consisting of keto and (H, βOH); R' is a member selected from the group consisting of hydroxy and an acyloxy residue of an acid selected from the group consisting of sulfuric acid, phosphoric acid, and a hydrocarbon carboxylic acid having up to 12 carbon atoms; and V is a member selected from the group consisting of hydroxy, lower alkanoyloxy and hydrogen; and when V is hydroxy and A is (H, αOH), the 16α,17α-alkylidenedioxy derivatives thereof.

References Cited by the Examiner
UNITED STATES PATENTS

| | | | |
|---|---|---|---|
| 2,446,538 | 8/48 | Julian et al. | 260—397.5 |
| 2,927,119 | 3/60 | Ellis et al. | 260—397.5 |
| 3,002,969 | 10/61 | Petrow et al. | 260—239.55 |
| 3,071,581 | 1/63 | Zderic et al. | 260—239.55 |
| 3,094,523 | 6/63 | Sletzinger et al. | 260—239.55 |

OTHER REFERENCES

Werder: Chem. Berichte 95, pp. 773–776 (1962).

LEWIS GOTTS, *Primary Examiner.*